(12) United States Patent
Suzuki et al.

(10) Patent No.: US 7,834,955 B2
(45) Date of Patent: Nov. 16, 2010

(54) LIGHT REFLECTOR

(75) Inventors: Osamu Suzuki, Tokyo (JP); Yoshiyuki Nousou, Tokyo (JP); Nobuyuki Morita, Tokyo (JP); Kazuya Nagashima, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 907 days.

(21) Appl. No.: 10/585,418

(22) PCT Filed: Jan. 7, 2005

(86) PCT No.: PCT/JP2005/000130

§ 371 (c)(1),
(2), (4) Date: Mar. 23, 2007

(87) PCT Pub. No.: WO2005/066664

PCT Pub. Date: Jul. 21, 2005

(65) Prior Publication Data

US 2007/0217040 A1    Sep. 20, 2007

(30) Foreign Application Priority Data

Jan. 9, 2004   (JP) .............................. 2004-003972
Jun. 16, 2004  (JP) .............................. 2004-178502

(51) Int. Cl.
G02F 1/1335 (2006.01)
(52) U.S. Cl. ....................................................... 349/67
(58) Field of Classification Search ................. 349/67;
362/97.1–97.2
See application file for complete search history.

(56) References Cited

U.S. PATENT DOCUMENTS

| 4,211,473 | A  | * | 7/1980 | Shanks ........................ 349/164 |
| 6,935,766 | B2 | * | 8/2005 | Ato ............................. 362/633 |
| 6,943,855 | B2 | * | 9/2005 | Nakano ....................... 349/65 |
| 2002/0057405 | A1 |   | 5/2002 | Morishita et al. |

FOREIGN PATENT DOCUMENTS

| JP | 54 13457 | 1/1979 |
| JP | 9 216391 | 8/1997 |
| JP | 11 174213 | 7/1999 |
| JP | 2001 184914 | 7/2001 |
| JP | 2003 253224 | 9/2003 |
| JP | 2003 270415 | 9/2003 |
| JP | 2003 318347 | 11/2003 |
| JP | 2004 317818 | 11/2004 |
| JP | 2005 49573 | 2/2005 |
| WO | 03 002337 | 1/2003 |
| WO | 03 014778 | 2/2003 |
| WO | 03 032073 | 4/2003 |

OTHER PUBLICATIONS

U.S. Appl. No. 11/578,052, filed Oct. 12, 2006, Nousou, et al.

* cited by examiner

*Primary Examiner*—James A Dudek
(74) *Attorney, Agent, or Firm*—Oblon, Spivak, McClelland, Maier & Neustadt, L.L.P.

(57) ABSTRACT

A technology for effectively preventing deformation of a light reflector plate fabricated by forming a synthetic resin reflector plate into a three-dimensional shape enabling a thinner light reflector plate, and additionally, reducing processing costs is provided. An adhesive tape for shape-retention is adhered onto a reflector plate which is fabricated by forming predetermined areas of a light-reflecting plastic film or sheet into a three-dimensional shape.

10 Claims, 2 Drawing Sheets

[Fig. 1]
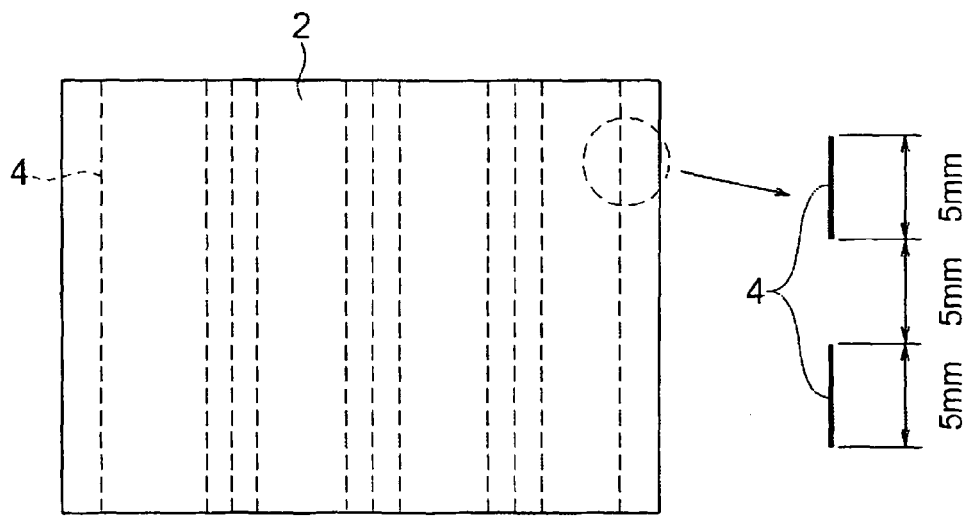
[Fig. 2]
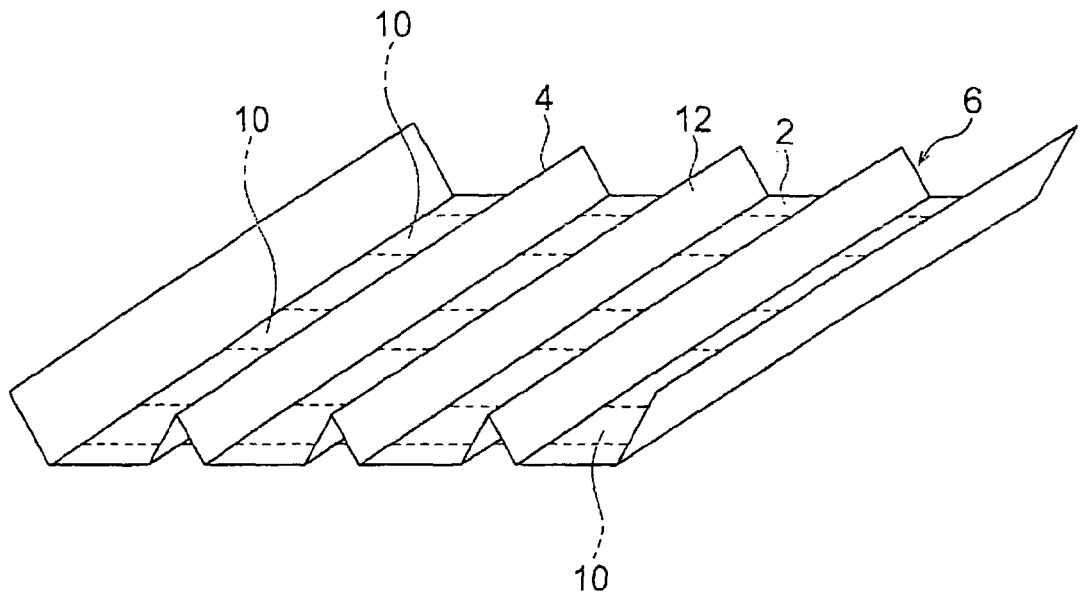

[Fig. 3]
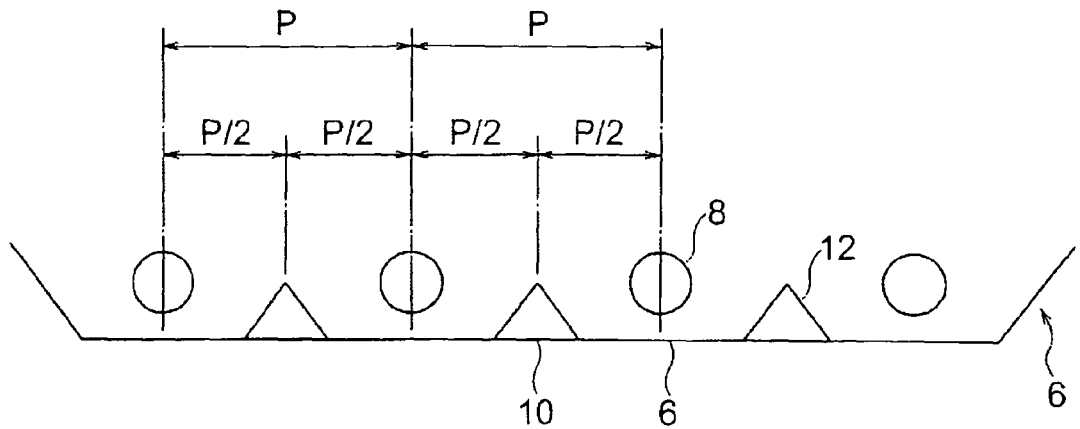
[Fig. 4]
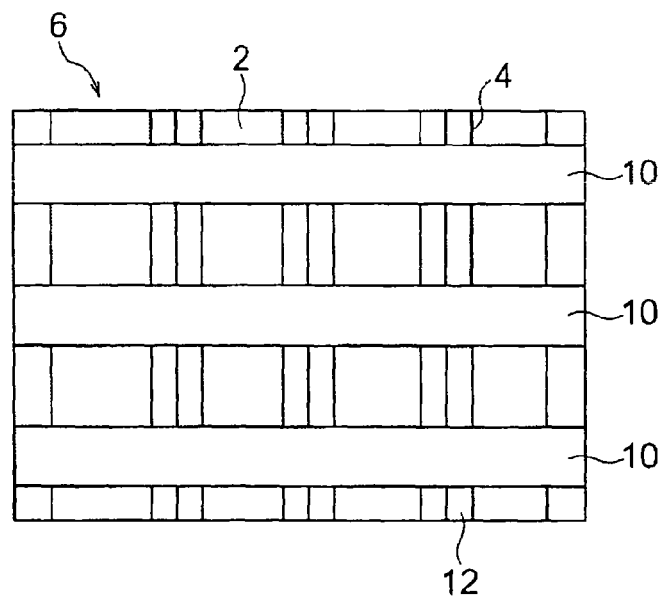
[Fig. 5]
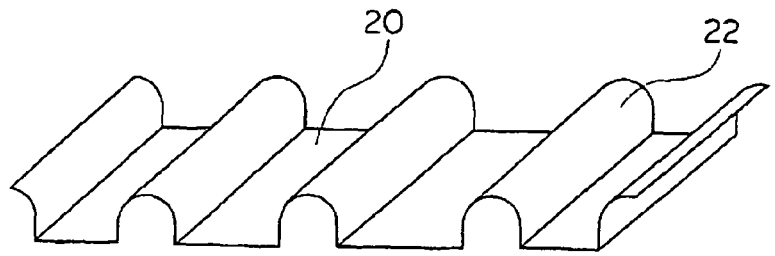

LIGHT REFLECTOR

TECHNICAL FIELD

The present invention relates a three-dimensional light reflector plate enabling brighter and thinner backlights and illumination boxes for illumination signboards, liquid crystal display devices, lighting fixtures, and the like.

BACKGROUND ART

Conventionally proposed light reflector plates for use in illumination signboards, liquid crystal display devices, lighting fixtures, and the like, include those fabricated such that a synthetic resin reflector plate is formed into a three-dimensional shape to thereby yield a light reflector plate (refer to, for example, Patent Reference 1).

Patent Reference 1: Japanese Patent Laid-Open Publication No. 2002-122863

DISCLOSURE OF THE INVENTION

Problems to be Resolved by the Invention

Deformation of the foregoing light reflector plate fabricated by forming a synthetic resin reflector plate into a three-dimensional shape occurs after manufacture due to strain during forming and shrinkage after forming. Therefore, a proposed means for preventing this deformation of the light reflector plate is a means for fixing the reflector plate and a metal casing by providing the light reflector plate with a hole or a slit incision part, as well as forming a claw-shaped folding part on the metal casing, inserting the claw-shaped folding part of the metal casing into the hole or slit incision part of the light reflector plate, and furthermore, folding the claw-shaped folding part.

However, the foregoing light reflector plate deformation prevention means had demerits in that it was difficult to make the light reflector plate thin because a metal casing is required and the processing costs for fixing the light reflector plate and the metal casing was high.

In light of the foregoing issues, an object of the present invention is to provide a technology for effectively preventing deformation of a light reflector plate fabricated by forming a synthetic resin reflector plate into a three-dimensional shape and, additionally, reducing processing costs.

Means of Solving the Problems

In order to achieve the foregoing objective, the present invention provides a light reflector plate, composed of a reflector plate fabricated by forming predetermined areas of a light-reflecting plastic film or sheet into a three-dimensional shape, to which a shape-retentive component is fixed.

In the present invention, a shape-retentive component is fixed to a reflector plate which is formed into a three-dimensional shape. Deformation of the reflector plate is prevented by the effect of this shape-retentive component, and the shape is retained. Therefore, the light reflector plate can be made thinner compared to when metal casings are used. In addition, processing costs are reduced compared to fixing a light reflector plate and a metal casing because the present invention merely involves fixing the shape-retentive component to the reflector plate.

EFFECT OF THE INVENTION

According to the present invention, deformation of a light reflector plate fabricated by forming a synthetic resin reflector plate into a three-dimensional shape can be effectively prevented and, additionally, processing costs can be reduced, lowering costs.

BRIEF DESCRIPTION OF THE DRAWINGS

FIG. 1 is a diagram showing an example of an incision processing and an enlarged view of the incisions on a sheet before folding;

FIG. 2 is a perspective view of a light reflector plate using the sheet in FIG. 1;

FIG. 3 is a diagram showing the profile of the light reflector plate in FIG. 2 and the position of the fluorescent light;

FIG. 4 is a rear-surface view of the light reflector plate in FIG. 2; and

FIG. 5 is a perspective diagram showing a sheet forming an arch-shaped protruding part.

BEST MODE FOR CARRYING OUT THE INVENTION

The present invention is described in further detail hereafter. In the present invention, for example, general-purpose resins such as polyethylene, polypropylene, polystyrene, polyvinylchloride (PVC), polybiphenylchloride, polyethylene terephthalate and polyvinyl alcohol, engineering plastics such as polycarbonate, polybuthylene terephthalate, polyamide, polyacetal, polyphenylene ether, ultra-high molecular weight polyethylene, polysulfone, polyethersulfone, polyphenylenesulfide, polyarlate, polyamideimide, polyetherimide, polyetheretherketone, polyimide, polytetrafluoroethylene, liquid crystal polymer and fluororesin, or copolymers and mixtures thereof are given as materials for light-reflecting plastic film or sheet. Of these, due to superior heat-resistance and impact-resistance properties and the like, polyester, polyphenylenesulfide, polypropylene, and cyclopolyolefin are preferable. Antioxidant, ultraviolet inhibitor, lubricant, pigment, reinforcement and the like can be added accordingly to the resin used in the foregoing light-reflecting plastic film or sheet. In addition, a coating layer containing these additives may be applied and formed.

Specifically, preferred examples of the light-reflecting plastic film or sheet include a thermoplastic resin film or sheet having numerous fine bubbles or pores with a mean bubble diameter of 50 μm or less, or a thermoplastic resin film or sheet containing fillers wherein numerous voids are formed with the filler as the core. In this case, in the latter film or sheet, the thermoplastic resin film or sheet containing fillers is preferably a porous stretched film or sheet, wherein numerous voids are formed with the filler as the core by forming an un-stretched film or sheet containing fillers and stretching this un-stretched film or sheet.

In the present invention, although there are no limitations to the means for forming the reflector plate of light-reflecting plastic film or sheet into a three-dimensional form, preferably, a means for intermittently forming narrow slits which penetrate from the front surface of one side to the front surface of the opposite side of the film or sheet along a straight line and folding the film or sheet along these slits can be implemented.

In other words, although hot-forming can be performed with a mold or the like in order to process the resin reflector plate into a three-dimensional shape, not only is the processing accuracy poor due to shrinkage after hot-forming, but molds and processing costs are expensive, as well. On the contrary, by cutting perforation slits into the plastic film or sheet, it can be easily folded at this section and a three-dimensional shape can be formed accurately, realizing a folding processing with simple jigs and the like at a low cost, without the need for expensive molds or the like.

In this case, the film or sheet on which slits are formed is preferably the foregoing thermoplastic resin film or sheet having numerous fine bubbles or pores with a mean bubble diameter of 50 μm or less, or a thermoplastic resin film or sheet containing fillers wherein numerous voids are formed with the filler as the core.

In addition, preferably, the width of the slits formed on the plastic film or sheet is 3 mm or less, the length of one slit is 10 mm or less, the length of the un-cut section between two adjacent slits is 1 mm or more. In other words, in order to prevent the material from becoming severed from the slit part when folding along the perforated line after cuffing slits into the film or sheet, the un-cut sections between the intermittent slits are preferably 1 mm or more. In addition, with regards to the length of the slit, it is cheap and practical to perform processing with a standard commercially-sold cutting tool having a perforation cutting blade with a 10 mm pitch or less.

If, rather than cutting slits such as the foregoing into the film or sheet, a concave pressed-line is formed in a straight line on the surface of the film or sheet and the film or sheet is folded along this line, this is disadvantageous in that the folding processing is difficult because the folding force is large and the fold is not necessarily made at the line part.

In addition, if perforation cutting processing is performed as such in a plastic film or sheet which does not have bubbles, pores or voids, the film or sheet may not be equally cut throughout when the perforation cutting part is processed at once because it is hard, if there are many folds or the processing area is large (for example, such as in FIG. 1 and FIG. 2, described hereafter), and therefore, the film or sheet may not fold properly along the perforation. On the contrary, because plastic film or sheet having bubbles, pores, or voids is soft and easy to cut, it can be cut relatively cleanly, even if there are many perforations or the area is large.

The preferred shape-retentive component used in the present invention has mechanical characteristics preventing the deformation of a light reflector plate which has been formed into a three-dimensional shape, such as, for example, adhesive tape, cords, pins, or the like. The shape-retentive component preferably has heat-resistant properties of 130° C.

If adhesive tape is implemented as the shape-retentive component, though the base material of the adhesive tape is not limited, polymers such as polyester, polyolefin, cyclo-polyolefin, polyamide, polyarlate, polycarbonate, polyacetal, polyphenylene ether, polymethylpentene, and liquid crystal polymer, or metals such as aluminum and stainless steel can be given. If a polymer is implemented as the base material of the adhesive tape, polyester, polypropylene, or cyclopolyolefin is particularly preferable among these, due to favorable heat-resistance and impact-resistance properties. Furthermore, the adhesive tape is preferably colorless or white. If the adhesive tape is colored in another color, this color may appear on a screen when the light reflector plate is implemented in a liquid crystal display device. The material of the adhesive on the adhesive tape can be selected accordingly, taking into consideration the foregoing points.

EXAMPLES

Next, examples of a light reflector plate according to the present invention are described with reference to the drawings. However, the present invention is not limited to the following examples.

Example 1

There is a foamed plastic light reflector sheet (for example, MCPET (registered trademark), manufactured by Furukawa Electric Co., Ltd) with a thickness of 1 mm and bubbles with a bubble diameter of 50 μm or less, which is a thermoplastic polyester extrusion sheet heated and foamed after impregnating with carbon dioxide gas under high pressure. In addition, there is a cyclopolyolefin foamed plastic light reflector film with a thickness of 0.5 mm and bubbles with a bubble diameter of 50 μm or less. When these light reflector sheet and film are incorporated as reflector plates for backlight of a liquid crystal display device, the following example can be given as an example for manufacturing a three-dimensional light reflector plate behind the fluorescent light which is to be the light source of the backlight.

As shown in FIG. 1, perforations 4 were formed linearly using a band-blade press cutting blade with a blade thickness of 0.7 to 1.42 mm, for cutting perforations of 5 mm length intervals into a sheet, on a foamed polyethylene terephthalate sheet 2 (foregoing MCPET) which had been foamed by fourfold, with a thickness of 1 mm and a mean bubble diameter of 50 μm or less. Then, as shown in FIG. 2, a reflector plate 6 was obtained by folding the foamed sheet 2 at the perforation parts 4 such as to form linear mountain-shapes. The pitch of the folded mountain-shapes is, as shown in FIG. 3, designed such that the peak parts of the mountains are in a position, P/2, almost midway between the fluorescent lights 8, according to the pitch P of the fluorescent lights 8 of the backlight. Molds were not used in the folding processing and the sheet was folded one mountain at a time using a tool shaped according to the mountain/valley shape.

Next, in order to retain the shape of the reflector plate 6, as shown in FIG. 2 to FIG. 4, three strips of adhesive tape 10, perpendicular to the perforation parts 4, were adhered on the back surface of the reflector plate 6 (opposite surface of the light source 8), from one edge part of the reflector plate 6 in the width direction to the other edge part with predetermined intervals therebetween, thus obtaining the light reflector plate of the present invention. In this case, the adhesive tapes 10 were adhered to the reflector plate 6 such as not to apply tension or sag. The light reflector plate of the present example has a plurality of mountain-shaped protrusion parts 12 along the length direction of the strip light sources 8 and the shape of the mountain-shaped protrusion parts 12 is retained by the adhesive tape 10.

Comparative Example

A light reflector plate was obtained in the same way as Example 1, aside from not adhering adhesive tape to the back surface of the reflector plate 6. Deformations occurred in this light reflector plate due to strain during forming and shrinkage after forming.

Example 2

The light reflector plate of the present invention was obtained in the same way as Example 1, aside from implementing a porous stretched sheet with a thickness of 0.25 mm, wherein numerous voids are formed with calcium carbonate as the core by stretching an un-stretched polyethylene terephthalate sheet containing calcium carbonate (filler), continuously forming a cut groove which does not penetrate the surface of the sheet on the sheet along a straight line, folding the sheet along this cut groove, and adhering adhesive tape to the entire back surface of the reflector plate. The light reflector plate of the present example has a plurality of mountain-shaped protrusion parts along the length direction of the strip light sources and the shape of the mountain-shaped protrusion parts is retained by the adhesive tape.

Example 3

The light reflector plate of the present invention was obtained in the same way as Example 1, aside from implementing, as the light reflector sheet, a combined sheet wherein a porous stretched sheet with a thickness of 0.1 mm, wherein numerous voids are formed with calcium carbonate as the core by stretching an un-stretched polyethylene terephthalate sheet containing calcium carbonate (filler), is laminated with an aluminum sheet. An aluminum sheet was laminated onto this combined sheet because the porous, stretched polyethylene terephthalate sheet is thin, has no independence, and cannot retain a three-dimensional shape alone. The light reflector plate of the present example has a plurality of mountain-shaped protrusion parts along the length direction of the strip light sources and the shape of the mountain-shaped protrusion parts is retained by the adhesive tape.

Example 4

The light reflector plate of the present invention was obtained in the same way as Example 1, aside from implementing, as the foamed polyethylene terephthalate sheet 2 (foregoing MCPET) which had been foamed by four-fold, with a thickness of 1 mm and a mean bubble diameter of 50 µm or less, a sheet which had been foamed after fabricating the base plate 20 of the polyethylene terephthalate sheet, prior to foaming, into a form having curved arch-shaped (semicircular cross-section) protrusion parts 22 by a press, as shown in FIG. 5. The sheet was pressed before foaming because the bubbles will break if the sheet was pressed after foaming. The light reflector plate of the present example has a plurality of mountain-shaped protrusion parts along the length direction of the strip light sources and the shape of the mountain-shaped protrusion parts is retained by the adhesive tape.

Although three strips of adhesive tape were adhered on the back surface of the reflector plate from one edge part of the reflector plate in the width direction to the other edge part with predetermined intervals therebetween or the adhesive tape was adhered on the entire back surface of the reflector plate, the number of strips of adhesive tape and the method of adhering can be set accordingly, so long as deformation of the reflector plate can be prevented by the adhesive tape.

Example 5

The light reflector plate of this example is the same as Example 1, aside from implementing aluminum tape with a thickness of 0.1 mm as the shape-retentive component. The light reflector plate of the present example has a plurality of mountain-shaped protrusion parts along the length direction of the strip light sources and the shape of the mountain-shaped protrusion parts is retained by the aluminum tape.

INDUSTRIAL APPLICABILITY

According to the light reflector plate of the present invention, the backlights and illumination boxes for illumination signboards, liquid crystal display devices, lighting fixtures and the like can be made brighter and thinner and illuminated efficiently. In addition, according to the present invention, not only can deformation of the light reflector plate fabricated by forming a synthetic resin reflector plate into a three-dimensional shape can be prevented effectively and the light reflector plate can be made thinner, but processing costs can be reduced as well, thereby lowing costs.

The invention claimed is:

1. A light reflector plate, comprising:
    a light-reflecting plastic film or sheet including predetermined areas having a three-dimensional shape, the three-dimensional shape being formed of a plurality of parallel projections such that the film or sheet has a peak-and-valley shape; and
    a shape-retentive component fixed to an underside of the film or sheet abutting a valley portion of the three-dimensional shape, thereby retaining the three-dimensional shape of the projections.

2. The light reflector plate according to claim 1, wherein said light-reflecting plastic film or sheet is a thermoplastic resin film or sheet having numerous fine bubbles or pores with a mean bubble diameter of 50 µm or less.

3. The light reflector plate according to claim 1, wherein said light-reflecting plastic film or sheet is a thermoplastic resin film or sheet containing fillers, and
    wherein numerous voids are formed with said filler as a core.

4. The light reflector plate according to claim 3, wherein said thermoplastic film or sheet containing fillers is a porous stretched film or sheet, and
    wherein the numerous voids are formed with said filler as the core by forming an un-stretched film or sheet containing fillers and stretching said un-stretched film or sheet.

5. The light reflector plate according to claim 1, wherein said reflector plate includes narrow slits disposed along a straight line, the slits penetrating from a front surface of a first side to a front surface of a second opposite side of said light-reflecting plastic film or sheet, and
    wherein the film or sheet is folded along said straight line of slits.

6. The light reflector plate according to claim 1, wherein said shape-retentive component is an adhesive tape.

7. The light reflector plate according to claim 6, wherein a base material of said adhesive tape includes at least one of polyester, polypropylene, and cyclopolyolefin.

8. The light reflector plate according to claim 2, wherein said reflector plate includes narrow slits disposed along a straight line, the slits penetrating from a front surface of a first side to a front surface of a second opposite side of said light-reflecting plastic film or sheet, and
    wherein the film or sheet is folded along said straight line of slits.

9. The light reflector plate according to claim 3, wherein said reflector plate includes narrow slits disposed along a straight line, the slits penetrating from a front surface of a first side to a front surface of a second opposite side of said light-reflecting plastic film or sheet, and
    wherein the film or sheet is folded along said straight line of slits.

10. The light reflector plate according to claim 4, wherein said reflector plate includes narrow slits disposed along a straight line, the slits penetrating from a front surface of a first side to a front surface of a second opposite side of said light-reflecting plastic film or sheet, and
    wherein the film or sheet is folded along said straight line of slits.

* * * * *